United States Patent
Temkin et al.

(10) Patent No.: US 9,812,864 B2
(45) Date of Patent: Nov. 7, 2017

(54) ADAPTIVE POWER SYSTEM

(71) Applicant: The Johns Hopkins University, Baltimore, MD (US)

(72) Inventors: Deanna K. Temkin, Silver Spring, MD (US); Tyler J. Boehmer, Columbia, MD (US)

(73) Assignee: The Johns Hopkins University, Baltimore, MD (US)

(*) Notice: Subject to any disclaimer, the term of this patent is extended or adjusted under 35 U.S.C. 154(b) by 208 days.

(21) Appl. No.: 14/945,525

(22) Filed: Nov. 19, 2015

(65) Prior Publication Data

US 2017/0201097 A1 Jul. 13, 2017

Related U.S. Application Data

(60) Provisional application No. 62/104,884, filed on Jan. 19, 2015, provisional application No. 62/103,854, filed on Jan. 15, 2015.

(51) Int. Cl.
| | |
|---|---|
| *H02J 3/46* | (2006.01) |
| *H02J 3/28* | (2006.01) |
| *H02M 1/44* | (2007.01) |
| *H02M 3/158* | (2006.01) |
| *H02M 7/06* | (2006.01) |

(52) U.S. Cl.
CPC ............... *H02J 3/28* (2013.01); *H02M 1/44* (2013.01); *H02M 3/158* (2013.01); *H02M 7/06* (2013.01)

(58) Field of Classification Search
CPC ............ H02J 3/28; H02M 1/44; H02M 3/158; H02M 7/06

USPC .......................................................... 307/151
See application file for complete search history.

(56) References Cited

U.S. PATENT DOCUMENTS

| | | | | |
|---|---|---|---|---|
| 6,255,744 B1* | 7/2001 | Shih | ........................... | G06F 1/30 307/64 |
| 6,278,279 B1* | 8/2001 | Daun-Lindberg | ..... | G01R 31/40 324/427 |
| 6,304,059 B1* | 10/2001 | Chalasani | ............ | H02J 7/0018 320/118 |
| 6,459,173 B1* | 10/2002 | Gunsaulus | ................ | H02J 9/06 307/18 |
| 7,567,060 B1* | 7/2009 | Atcitty | .................... | G01R 31/40 307/64 |
| 8,179,698 B2* | 5/2012 | Jang | ......................... | H02J 7/345 363/17 |
| 8,878,505 B2 | 11/2014 | Temkin | | |
| 9,041,354 B2* | 5/2015 | Lee | ........................... | H02J 7/35 307/25 |
| 2001/0040410 A1* | 11/2001 | Akiba | ................... | H02J 7/0068 307/39 |
| 2005/0006958 A1* | 1/2005 | Dubovsky | ............... | H02J 3/382 307/64 |

(Continued)

*Primary Examiner* — Ryan Jager
(74) *Attorney, Agent, or Firm* — Noah J. Hayward

(57) ABSTRACT

An adaptive power system includes an energy source, a bidirectional current source electrically connected between the energy source, and a power distribution bus of a power distribution system. The bidirectional current source delivers and absorbs power from the power distribution system to buffer a dynamic load profile of a dynamic load. The adaptive power system also includes a control loop and signal filter to control the bidirectional current source and regulate energy stored in the energy source.

18 Claims, 9 Drawing Sheets

(56) References Cited

U.S. PATENT DOCUMENTS

2011/0291611 A1* 12/2011 Manor .................... H02J 7/022
                                                    320/107
2017/0149369 A1*  5/2017 Watabu .................. H02P 27/06

* cited by examiner

A

B

C

D

ADAPTIVE POWER SYSTEM

CROSS-REFERENCE TO RELATED APPLICATIONS

This application claims priority to and the benefit of prior-filed U.S. Provisional Application Ser. Nos. 62/103,854 and 62/104,884, filed Jan. 15, 2015 and Jan. 19, 2015, respectively, the contents of which are herein incorporated by reference in their entireties.

STATEMENT OF GOVERNMENTAL INTEREST

This invention was made with Government support under contract number N00024-03-D-6606 awarded by the Naval Sea Systems Command (NAVSEA). The Government has certain rights in the invention.

TECHNICAL FIELD

Example embodiments generally relate to power systems and, in particular, relate to an adaptive power system for dynamic loads.

BACKGROUND

Dynamic loads, such as high-energy sensors or energy based weapons, may be deployed on platforms including ships, planes, satellites, or the like. The dynamic loads may consume a large portion of the platform's electrical power resources and thereby cause extreme power transients. These extreme power transients may have dynamic load profiles, including both periodic predictable characteristics and aperiodic unpredictable characteristics. The dynamic load profiles may cause sudden changes in power at the platform's power distribution system. The sudden changes of power may be stressing to platform systems, including generators, prime movers, and other loads sharing a common bus of the power distribution system. Duty cycles of the dynamic loads may vary from small to continuous and, for some cases, the peak power demands may be above the capability of the platform's power plant. These types of extreme dynamic load profiles may not be supported with conventional power distribution systems.

Conventional power distribution systems have focused heavily on providing well-regulated voltages and clean power to a corresponding load. Typically, the voltage dynamics of the load may be minimized by minimizing the output impedance of each converter stage by using small series inductance values, large shunt capacitance values, and/or control loops with high bandwidths. However, conventional power distribution systems may do little to prevent the mid to low frequency load dynamics from propagating back to the distribution bus and generator.

In an instance in which the dynamic load profiles propagate back to the platform's electric plant, significant power quality issues and generator/distribution losses may occur. Additionally, dynamic pulse loading of a dynamic load profile may cause wear and tear on mechanical parts of the generator. Torsional stresses to the shaft of the platform's prime mover may result due to very large and quickly changing electromagnetic load torques. The dynamic electromagnetic load torques may also excite the shaft's torsional resonances, e.g. sub-synchronous resonances, adding additional stresses to the shaft.

In some examples, a power distribution system may be buffered from dynamic load profiles by a brute force method, a throw away power method and/or a restricted-timeline method. In an example power distribution system utilizing the brute-force method, passive filters may be used to smooth the dynamics of the dynamic load profile. Although the brute force method results in minimal additional power losses, achieving the smoothing and/or filtering desired by the platform power system may require filter sizes and/or weights that are impractical or prohibitive for platform, such as a ship, installation.

In an example power distribution system utilizing the throw-away-power method, when the load is not using the maximum power allocated, the excess power is dissipated in an active load. This type of power distribution system may increase the reliability of the generator and minimize bus disturbances by maintaining a constant load profile to the generators. However, the active load may have severe impacts on power distribution system efficiency resulting from the large additional power dissipation, increasing both cooling requirements and fueling costs for the platform.

In an example power distribution system utilizing the restricted-timeline method, the power distribution system may include a predefined charging time for the power distribution system. Pulse power may only be supplied by the power distribution system to the load at predefined scheduled time intervals. For these power distribution systems, the successive power pulses, e.g. launch times or fire times (repetition rate) and corresponding system performance are limited by the charging times of the power distribution system. Some examples of such systems include the Electromagnetic Aircraft Launch System (EMALS) and rail guns.

BRIEF SUMMARY

Accordingly, some example embodiments may enable an adaptive power system including an energy source, and a bidirectional current source configured to be electrically connected between the energy source and a power distribution bus of a power distribution system. The bidirectional current source is configured to deliver and absorb power from the power distribution system to buffer a dynamic load profile. The adaptive power system may also include a control loop and a signal filter configured to control the bidirectional current source and regulate energy stored in the energy source.

In another example embodiment, a power distribution system is provided including a dynamic load, a generator configured to supply power to the dynamic load via a power distribution bus, and an adaptive power system. The adaptive power system may include an energy source, and a bidirectional current source configured to be electrically connected between the energy source and a power distribution bus of a power distribution system. The bidirectional current source is configured to deliver and absorb power from the power distribution system to buffer a dynamic load profile of a dynamic load. The adaptive power system may also include a control loop and signal filter configured to control the bidirectional current source and regulate energy stored in the energy source.

BRIEF DESCRIPTION OF THE SEVERAL VIEWS OF THE DRAWING(S)

Having thus described the adaptive power system in general terms, reference will now be made to the accompanying drawings, which are not necessarily drawn to scale, and wherein:

DETAILED DESCRIPTION

Figure 1:
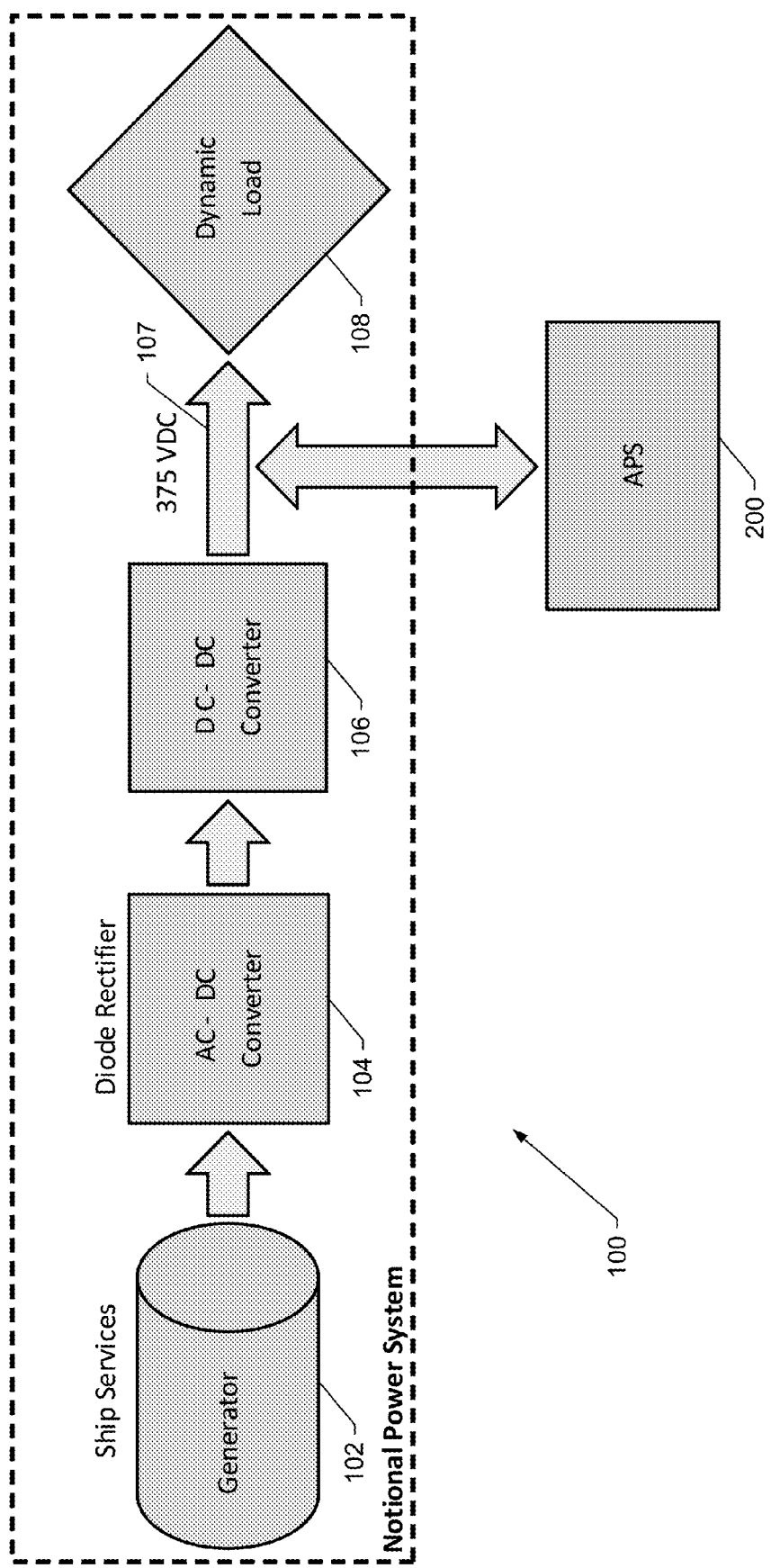
FIG. 1 illustrates an example notional power system with an adaptive power system according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

In an example embodiment an adaptive power system (APS) is provided including, a storage capacitor, and a bidirectional current source configured to be electrically connected between the storage capacitor and a power distribution bus. The bidirectional current source may be configured to supply power to the power distribution system to buffer a dynamic load profile of a dynamic load. A control loop and signal filter are also provided and configured to control the APS output current to match the dynamic current of the load and regulate energy stored in the storage capacitor.

The APS may support the dynamic load at a fraction of the size and weight needed when compared with the passive filter, e.g. brute-force, method; without excessive power dissipation as would exist if using the active load, e.g. throw-away, method; and for some applications without timeline restrictions as would be needed if using a refresh or recharging type system, e.g. the restricted-timeline method.

In an example embodiment, an APS may be configured such that no timeline restrictions exist, such as when the desired combination for a duty cycle (e.g. repetition rate, peak power levels, and average power over a load cycle) is within the allotted generator power. Alternatively, in an instance in which there are dynamic load profiles for which the average power is above the generator capability, the APS may be configured to provide the needed delta in power, allowing enhanced operation of the dynamic load for short periods of time. The time limit for the enhanced operation may be limited by the APS power rating, the size of the energy storage needed to provide the delta power, and/or the maximum average source power available. This maximum average source power available may determine the corresponding maximum duty cycle of this enhanced operation and the resulting quickest recharge time for the APS energy storage.

As discussed above, the dynamic load profiles of the dynamic loads may be significantly more than noise riding on top of an average power, the dynamic load profiles may vary greatly and be aperiodic. In some example embodiments, the dynamic loads may not only produce noise at harmonic frequencies, but also large levels of noise at interharmonic (not multiples of 60 Hz) and sub-harmonic (less than 60 Hz) frequencies. The control loop and energy storage, e.g. storage capacitor, may enable the APS to reduce the rate at which the power demand on the generator changes, thus limiting the dynamics and spectral content seen by the generator. Limiting the dynamics and spectral content seen by the generator may allow a dynamic load, such as a weapon or sensor system, to be compatible with the platform's power distribution system.

Example Notional Power System

FIG. 1 illustrates an example notional power system with an adaptive power system according to an example embodiment. In an example embodiment, a platform may include a notional power system 100. The notional power system 100 may include a generator 102, an alternating current (AC) to direct current (DC) converter 104, a DC-DC converter 106, a DC bus 107, and a dynamic load 108. The generator 102 may be a steam turbine, gas turbine, jet turbine type generator, diesel generator, or other generator configured to supply power to the platform. The generator 102 may output 300 VAC, 450 VAC, 4160 VAC, or the like. The AC-DC converter 104 may be a solid state rectifier, such as a diode rectifier, a motor generator, or the like, configured to convert the AC power generated by the generator 102 to VDC. In an example embodiment, the DC-DC converter 106 may be provided to convert the voltage output by the AC-DC converter 104 to a different voltage to supply the DC bus 107. In an example embodiment, the generator may output 450 VAC, which may be converted to 450 VDC by the AC-DC converter 104. The DC-DC converter 106 may convert the 450 VDC to 375 VDC to supply the DC bus 107, which in turn supplies the dynamic load 108.

As discussed above the dynamic load 108 may cause extreme variations to the dynamic load profiles on the DC bus 107. In an example embodiment, an adaptive power system (APS) 200 may be electrically connected to the DC bus 107 in shunt. The APS 200 may include a capacitor or capacitor bank and a regulation circuit, such as a control loop configured to control a bi-directional current source (BDCS), and a signal filter. A low pass filter may be used to limit the bandwidth required by the APS 200. An EMI filter may be used to reduce the switching noise of the BDCS. The APS 200 may mitigate bus disturbances and reduce the stresses to the generator 102 by converting the dynamic power load on the notional power system 100 into an equivalent rolling average. In an example embodiment, the energy stored in the capacitor may be regulated via the energy compensation loop, which slowly adjusts a reference current to maintain capacitor voltage within allowable boundaries.

In contrast to conventional power distribution system dynamic load compensation methods, which may utilize voltage regulation to keep the voltage of the capacitor within allowable bounds, the APS 200 may utilize energy regulation. Energy regulation by the APS 200 may linearize an energy compensation loop transfer function with respect to the BDCS. The BDCS may provide power complementary to the dynamic load profile from the APS 200 to the dynamic load 108 providing a buffer to upstream power equipment, e.g. generator 102. Detailed discussion of the APS 200 is provided below in reference to FIG. 3.

Figure 2:
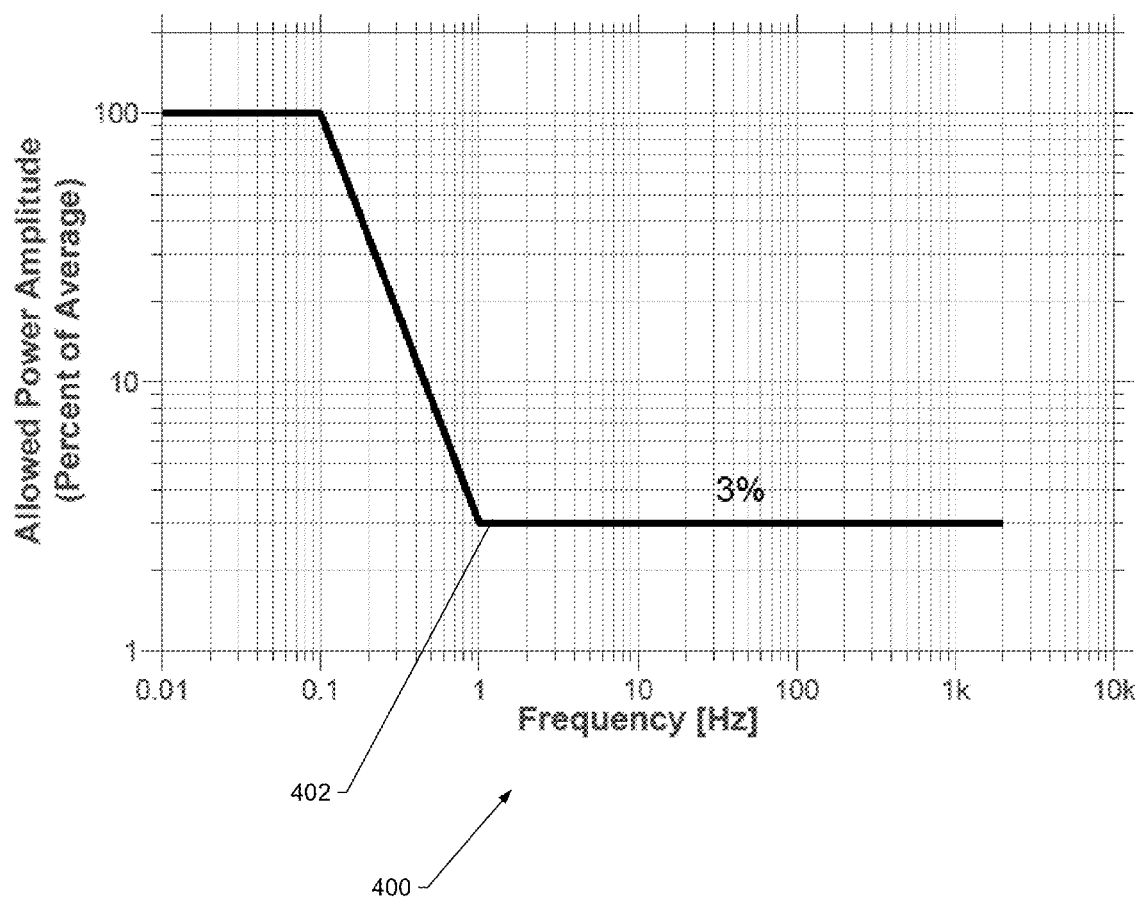
FIG. 2 illustrates an example power ripple filtering requirement graph according to an example embodiment.

FIG. 2 illustrates an example power ripple filtering requirement graph 400 according to an example embodiment. The power ripple filtering requirement graph 400 may include power ripple limit line 402. In an example embodiment, the combined three phase peak power ripple seen by the generator 102 at any single frequency generated by the dynamic load 108 will be less that than the power ripple limit 402.

Figure 3:
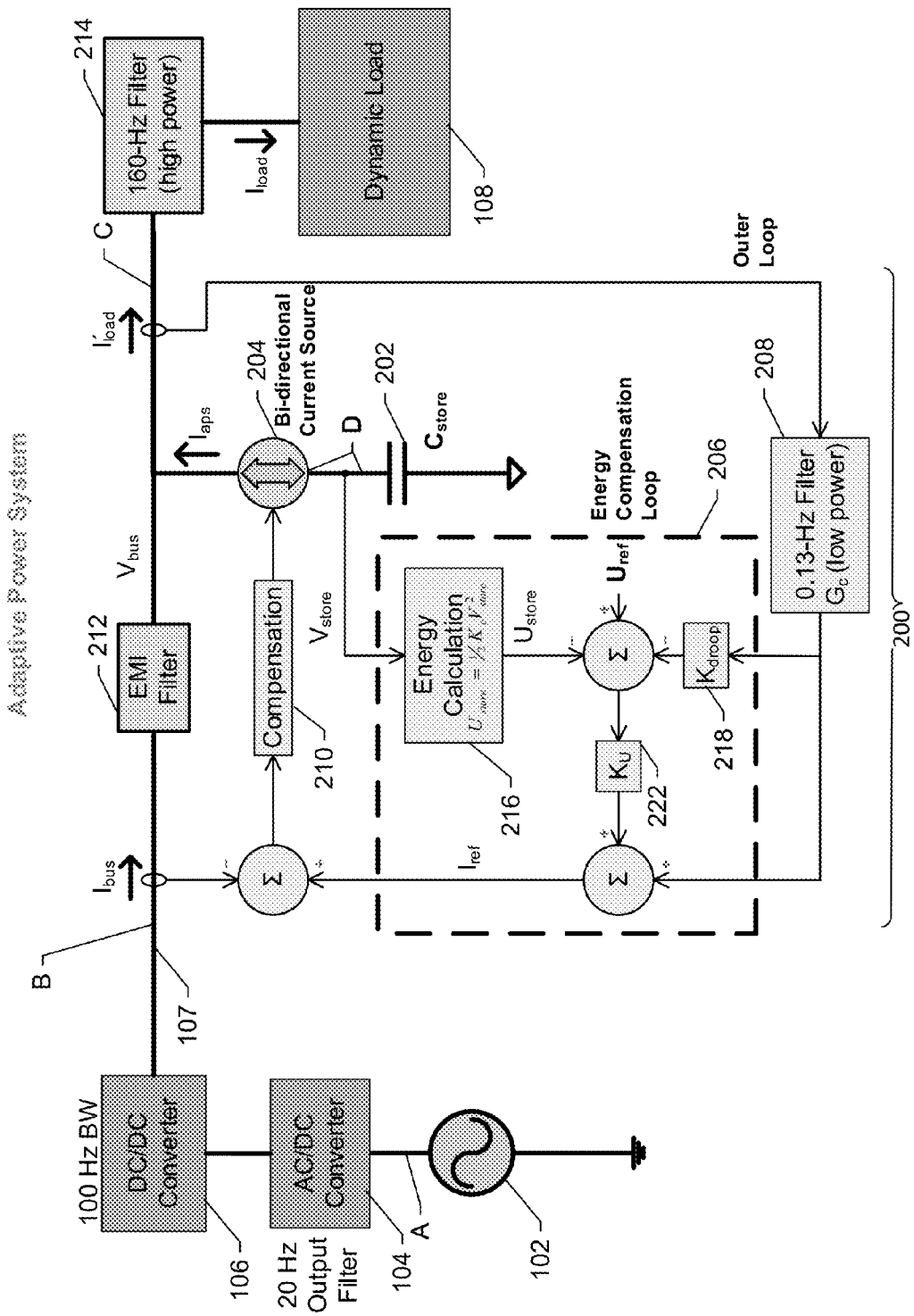
FIG. 3 illustrates functional schematic of the adaptive power system according to an example embodiment.

The resulting allowed load profile depicted in FIG. 3, e.g. the area under the power ripple limit 402, has been matched to generator 102 and prime mover performance. Typical generator 102 response times to a significant load change are on the order of 1.0 to 1.5 sec. If the rise and fall times for power changes (ramp rate) seen by the generator 102 are controlled to be slower than the generator 102 response times, the generator 102 and prime-mover control loops may be able to maintain the voltage and speed regulation, bus disturbances may be kept to a minimum for such a slow-changing power profile, and sub-synchronous resonances may not be excited because the disturbances are at lower frequencies than the shaft resonances. Additional losses and bus disturbances due to high harmonic and inter-harmonic noise may also be eliminated. The 3% value for frequencies greater than 1 Hz is chosen in order to be consistent with the existing 60 Hz harmonic line current requirement specified in MIL-STD-1399-680. The corner frequencies in FIG. 2 may be shifted to be consistent with the generator response times. For a slower generator the corner frequencies may be shifted to the left and for a faster generator the corner frequencies may be shifted to the right.

Example Adaptive Power System

FIG. 3 illustrates functional schematic of the APS 200 according to an example embodiment. The APS 200 may include an energy source, such as storage capacitor ($C_{store}$) 202, a BDCS 204, an energy compensation loop 206, a filter 208, such as signal filter 208, and a compensation circuit 210. The filter 208 may be configured to regulate the APS 200 current output to the DC bus 107 to provide the dynamic current to the dynamic load 108 using the energy from the storage capacitor 202. In an example embodiment, the signal filter 208 may be a 0.13 Hz filter, such as in the present example. The energy compensation loop 206 may be configured to maintain a voltage across the storage capacitor 202 within an allowable rating.

Although, discussed herein as a storage capacitor 202, the energy source may be any suitable energy source, such as a battery, superconducting magnetic energy storage (SMES) devices, super capacitors, or combinations thereof.

In an example embodiment, the APS 200 may be electrically connected, in shunt, to the DC bus 107. The current supplied by the generator 102, AC-DC converter 104, and the DC-DC converter 106 to the DC bus 107 ($I_{bus}$) may be regulated by the APS 200 to be equal to a filtered (0.13 Hz) current profile of the dynamic load 108. In some example embodiments, the compensation circuit 210 regulates $I_{bus}$ to be equal to $I_{ref}$ by controlling the output current of the BDCS 204, as depicted in the bus-current (B) and BDCS-current waveform (D) of FIG. 4. In some example embodiments, the BDCS 204 may be a DC/DC converter that may process power in both directions, e.g. the BDCS 204 may absorb or deliver power to the DC bus 107.

In an example embodiment, the AC component or dynamics of the dynamic load profile may be provided by the storage capacitor 202 via the BDCS 204; and is not part of $I_{bus}$. In an example embodiment, the capacitance value of the storage capacitor 202 may be selected based on being large enough to provide source and sink currents to support the dynamic load profile of the dynamic load 108. The capacitance value of the storage capacitor 202 may be minimized by allowing the voltage across storage capacitor 202 to vary significantly, where $U_{delivered} = \frac{1}{2} C_{store}(V_{t0}^2 - V_{t+}^2)$; where $U_{delivered}$ is the energy delivered or absorbed by the storage capacitor 202, and $V_{t0}$ and $V_{t+}$ are the corresponding voltages across the storage capacitor 202 just prior to a load disturbance of the dynamic load profile and after the storage capacitor 202 has delivered or absorbed the desired power. In some example embodiments, minimizing the capacitive value storage capacitor 202 provides significant weight and size savings compared to using an in-line high-powered low-pass filter (brute-force method). In some example embodiment, a voltage variation across the storage capacitor 202 may be decoupled from the from the DC bus 107, allowing tight regulation of the DC bus 107 voltage seen by the dynamic load 108 to be maintained.

In an example embodiment, a current reference, $I_{ref}$, may be slowly adjusted, to keep the voltage across the storage capacitor 202 within the allowable boundaries by regulating the energy stored in the storage capacitor 202 via the energy compensation loop 206.

In an example embodiment, the energy compensation loop 206 may include a gain $K_u$ 222 configured to set the bandwidth of the energy compensation loop. The energy compensation loop 206 may also include a voltage droop circuit $K_{droop}$ 218 configured to optimize the energy utilization of the storage capacitor 202.

In an example embodiment, the dynamic load may be controlled by selecting the corner frequency for the signal filter 208, e.g. a 0.13-Hz signal filter in the example depicted, in the current feedback path of the outer loop to be lower than the generator 102 voltage and speed control loop bandwidths. The corner-frequency selection for the signal filter may be the design parameter of the APS 200 that controls an allowed power ramp rate and dynamics seen by the generator 102 hence choosing the corner frequency appropriately may allow for stable generator 102 operation and with the dynamic load 108 and APS 200. The corner frequency requirement may be determined based on the power ripple requirement graph of FIG. 2, specifically the derived power ripple that the dynamic load 108 may place back on the generator 102. The corner frequency of the signal filter 208 may be tuned to the generator 102 performance and the power ripple requirement graph adjusted accordingly. For generators 102 with faster response times, the corner frequency of the signal filter 208 may be shifted up in frequency. For generators 102 with slower response times, the corner frequency of the signal filter 208 may be lowered in frequency. The resulting filtered signal may be the reference signal or command for controlling the bus current. The control loop may cause the APS 200 to deliver the dynamic current to the DC bus 107, such that the bus current matches the reference command which may be a rolling average of the dynamic load profile. In addition the reference command is slowly adjusted by the energy loop to maintain the proper voltage on the storage capacitor 202.

In an example embodiment, a low-pass filter 214 may be disposed between the APS 200 and the dynamic load 108, or between the power distribution system and the APS 200, to limit the bandwidth requirement of the APS 200. The low-pass filter 214 may reduce the response-time requirement of the APS 200 by reducing the high-frequency components of dynamic load profile seen at the DC bus 107 connection to the BDCS 204. The corner frequency for the low-pass filter 214 depicted in the present example is approximately 160 Hz.

As discussed, the APS 200 may absorb or deliver, e.g. sink and source, current through the BDCS 204, to compensate for the dynamic load profile. The BDCS 204 may be any appropriate BDCS topology, such as a bi-directional buck topology. Because the power for compensating for the dynamic load profile is not provided by the generator 102, the capacitance value of the storage capacitor 202 may be selected to be large enough to provide the source and sink currents to support the dynamic load profile demand in a time consistent with the signal filter 208 time constant, while concurrently maintaining the voltage across the storage capacitor 202 within the defined allowable range.

In an example embodiment, the voltage range of the storage capacitor 202 may be indirectly controlled by regulating the energy stored in the storage capacitor 202. The reference current, $I_{ref}$, is slowly adjusted to maintain the proper energy storage, thus keeping the proper voltage range across storage capacitor 202. Energy regulation is chosen over voltage regulation to linearize the outer loop transfer function with respect to the output current controlled by the BDCS 204. Energy regulation may reduce or eliminate the outer loop dependency on the duty cycle of the BDCS 204. The duty cycle of the BDCS 204 may vary with the voltage across storage capacitor 202 and, the outer loop bandwidth will remain constant as the voltage across storage capacitor 202 changes, because the transfer function $U_{delivered(s)}/I_{aps(s)}$ is independent of the voltage across storage capacitor 202.

In an example embodiment, an adaptive reference for the energy-storage loop may be used to reduce the capacitance value of the storage capacitor 202. The adaptive reference may be biased by the 0.13-Hz filtered load current from the signal filter 208. This technique may be similar to droop compensation regulation. In an instance in which the 0.13-Hz filtered load current from the signal filter 208 is at a maximum value, the reference, e.g. reference current, $I_{ref}$, for the compensation circuit 210 may be set to the minimum value, putting the storage capacitor 202 in an energy absorbing state. In an instance in which the 0.13-Hz filtered load current from the signal filter 208 is at a minimum value, such as 0 A, the reference, e.g. reference current, $I_{ref}$, for the compensation circuit 210 may be set to a maximum value, causing the storage capacitor 202 to be in an energy delivering state. In an example embodiment, the adaptive reference control maximizes the energy storage utilization of the storage capacitor and may, in some instances, reduce the required capacitance of the storage capacitor 202 by a factor of 2.

In some example embodiments, the APS 200 may also include an electromagnetic interference (EMI) filter 212. The EMI filter 212 may be configured to reduce or eliminate EMI produced by the APS 200 and/or the dynamic load 108. In an example embodiment, the EMI filter 212 may be disposed in between the generator 102 and the dynamic load 108. In some instances, the EMI filter 212 may be disposed after the DC-DC converter 106 or inline with the BDCS 204.

Figure 4:
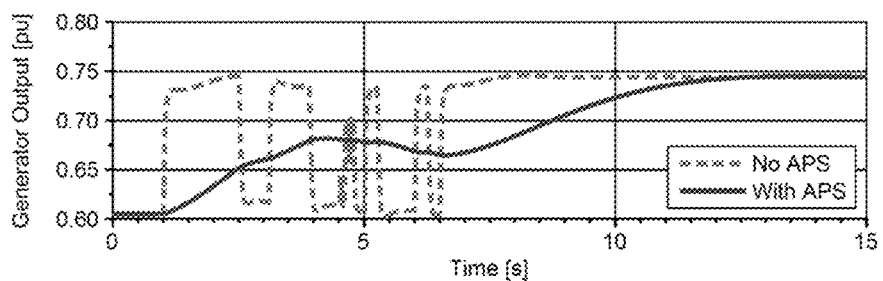
FIG. 4 illustrates example power, current, and voltage graphs associated with the adaptive power system according to an example embodiment.
Figure 4:
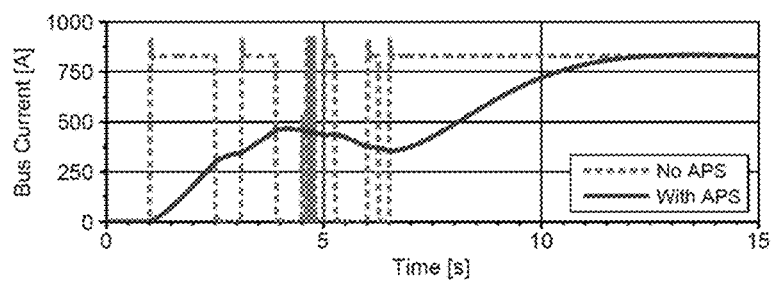
Figure 4:
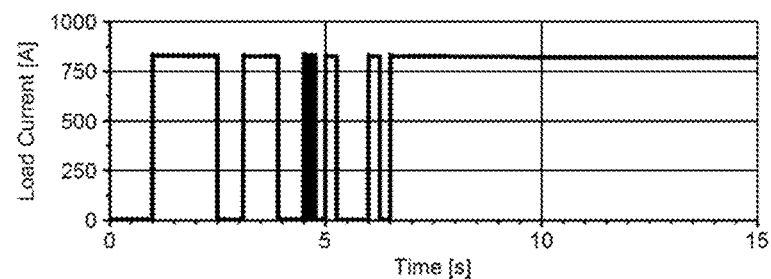
Figure 4:
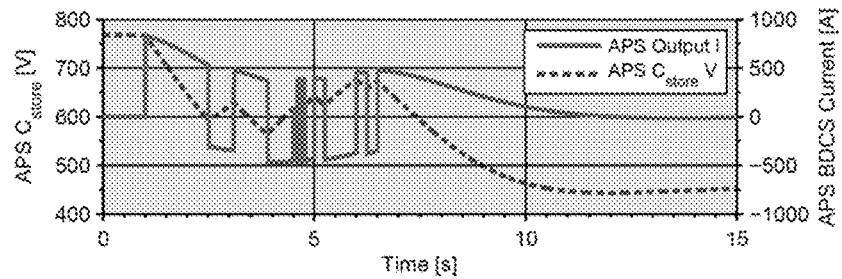

FIG. 4 illustrates example current graphs associated with the adaptive power system according to an example embodiment. Graphs A, B, C, and D correspond to points A, B, C, and D of FIG. 3. Graph A depicts the output power of generator 102 with a dynamic load profile with and without an instance of the APS 200. The dashed line depicts the generator output power without the APS 200, the generator output power has changes as the load current, depicted in graph C changes. The generator output with the APS 200 is a rolling average of the change in load current, graph C, which significantly reduces the stress on the generator 102. The bus current with and without the APS 200, depicted in graph B, may be consistent with the shape of the generator output power of Graph A.

Graph D depicts the voltage of storage capacitor 202 and the BDCS current 204 of the APS 200. The current supplied by the APS 200 (which is the BDCS current) tracks the load current, of graph C and reduces the stress on the generator 102.

Figure 5:
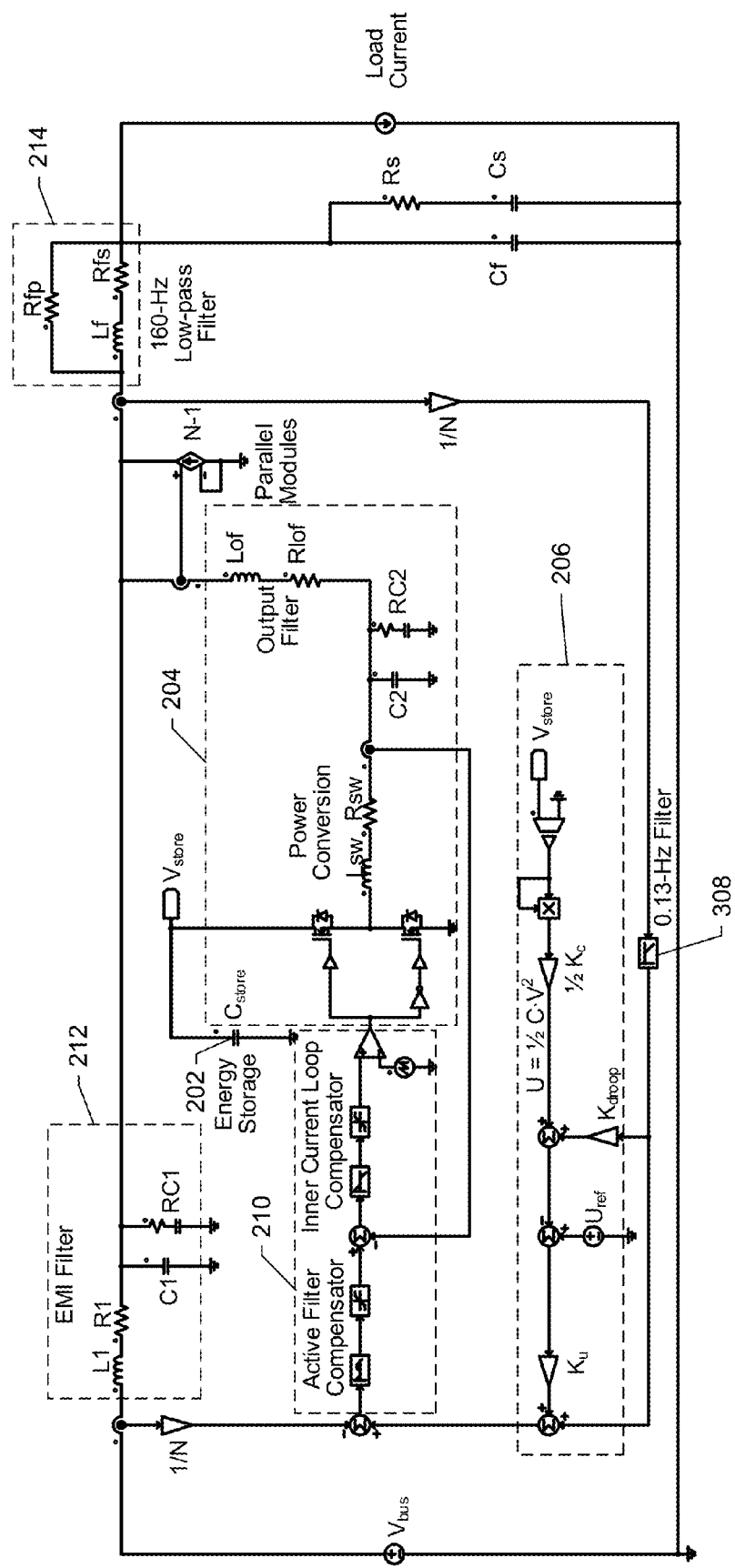
FIG. 5 illustrates an example schematic of an adaptive power system according to an example embodiment.

FIG. 5 illustrates an example schematic of an adaptive power system according to an example embodiment. The BDCS 204 is a modular design consisting of thirty-eight 8-kW modules. The sizing and performance for the BDCS 204 is based on the bi-directional buck topology, using a 100-kHz switching frequency and average current-mode control. The switching frequency is chosen high enough to obtain the needed control loop bandwidths (which may provide the desired APS 200 filtering performance) but low enough to maintain acceptable switching losses. The energy compensation loop 206 bandwidth of the BDCS 204 is set to be between 15 and 25 kHz (varying with the voltage across storage capacitor 202), allowing an operating frequency of the outer loop of the APS 200 to be set at 4 kHz.

In an example embodiment, the BDCS 204 may include silicon carbide device MOSFETs. The silicon carbide devices may be selected due to an inherently low drain to source parasitic capacitance, which may minimize the switching losses when operating at high voltage levels with hard switching.

In some example embodiments, the BDCS 204 may include inductors made from a magnetic material, such as VITROPERM® 500F from Vacuumscheize. VITROPERM® 500F or similar material may have significantly smaller AC core losses with higher saturation flux density capability than other core materials, such as MPP, High-Flux, and ferrites, which may result in fewer turns needed, and subsequently lower winding loss. Using VITROPERM® 500F may enable smaller and more efficient inductors. In an example embodiment, the peak flux density for each inductor may be limited to less than 0.8 T. The winding fill factor for the inductors may be low to achieve the inductance value desired with only a single winding layer. Thus, minimizing the AC winding losses for a 100-µH switching inductor and minimizes winding capacitance for all the inductors.

In an example embodiment, the inductors for the EMI filter 212 and low-pass filter 214 may be the same or similar design. In an instance in which the APS 200 is active and delivering or sourcing maximum current, only one of the EMI filter 212 and the low pass filter 214 may be dissipating power. In an instance in which the APS 200 is not active, both the EMI filter 212 and low-pass filter 214 may dissipate power, while the APS 200 power dissipation may be negligible. An efficiency may be calculated for the worst case power dissipation condition with the APS 200 active and either the EMI filter 212 or the low-pass filter 214 dissipating power, as discussed below.

In some example embodiments the storage capacitor 202 includes a capacitor bank. In the present example, the storage capacitor 202 includes 34 parallel strings of two 5.1 mF capacitors in series, resulting in 86.7 mF per BDCS 204 module. Each capacitor of the storage capacitor 202 may be rated for 550 V. An example storage capacitor 202 may include a 500C series type capacitor from Cornell Dubilier. The loss due to the storage capacitor 202 leakage current and the corresponding current due to a balance resistor across each capacitor is based on a total current draw of 100 µA per capacitor string. The balance-resistor current may be many times larger than the leakage-current value to ensure steady-state voltage balance across the capacitors in series.

The power dissipation of a low-pass filter 214 damping resistor, $R_{fp}$, may be determined by the current division between the winding resistance of $L_f$ and $R_{fp}$. Since the winding resistance is much smaller than $R_{fp}$, negligible power is dissipated in $R_{fp}$.

In the depicted example APS 200 of FIG. 5, total system peak losses are estimated to be approximately 6.6 kW under maximum output conditions, resulting in an efficiency of 97.9%, indicating the potential for significant power savings over the conventional throw-away-power method. To account for various cable losses, connection losses, and logic circuitry power dissipation, this number also includes an additional 30% losses captured under the Miscellaneous & Margin heading in Table 1, below.

TABLE 1

POWER LOSSES OF THE APS SYSTEM

| Single Module Losses | |
|---|---|
| Max FET (two Cree SiC FETs) | 91.9 W |
| Switching Inductor | 32.0 W |
| Output Filter Inductor | 0.5 W |
| $C_{store}$ Leakage and Balance Resistors | 2.6 W |
| Total Module Losses | 127.0 W |
| Number of Modules | 38 |
| Total BDCS Converter Losses | 4826 W |
| Other Losses | |
| EMI or Low Pass Filter | 210 W |
| Low Pass Filter Damping | 2 W |
| Miscellaneous & Margin | 1512 W |
| Total System Losses | 6550 W |

In the depicted example, the bandwidth for the outer energy compensation loop 206 is set at 0.02 Hz. The outer loop bandwidth is chosen high enough to maintain the energy and voltage compliance on the storage capacitor 202, but low enough to meet the power-ripple limit 402, such as depicted in FIG. 2.

The storage capacitor 202 or capacitor bank size may be determined based on closed-form equations for the transfer function $I_{bus(s)}/I_{load(s)}$ and the capacitance value of the storage capacitor 202. Because the desired behavior of the APS 200 at very low frequencies (less than 1 Hz) determines the required energy-storage capacitance value, the current control loops with the high bandwidths (4 kHz and 15 kHz) may be assumed ideal for these derivations, which means that for low frequencies it may be assumed that the bus current $I_{bus}$ follows the reference current $I_{ref}$. Further simplifications used in this derivation include the assumptions that the bus voltage is constant for low frequencies, that the energy transfer between storage capacitor 202 and the DC bus 107 is lossless, i.e., the energy delivered or absorbed by the storage capacitor 202 equals $V_{bus}*I_{aps}$, and that the EMI filter 212 and the low-pass filter 214, e.g. the 160-Hz filter, also have no effect at the low frequencies of interest.

Figure 6:
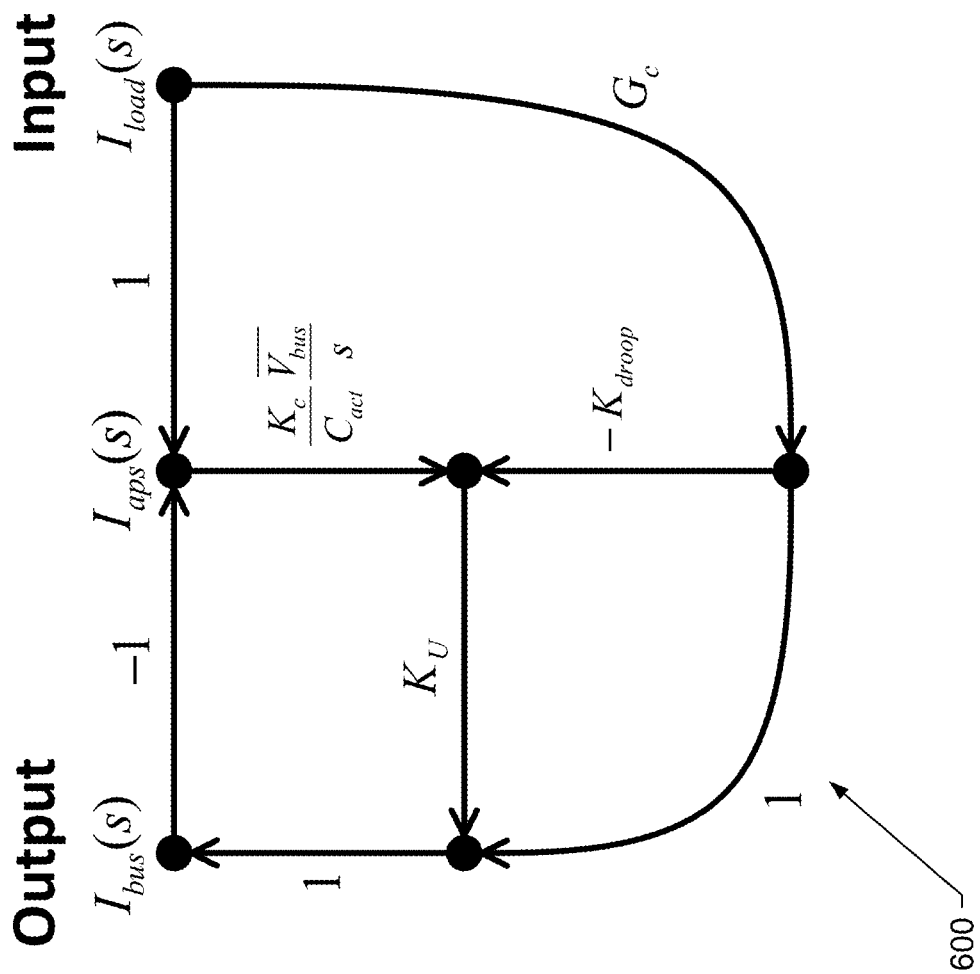
FIG. 6 illustrates an example signal flow graph for an adaptive power system according to an example embodiment.

FIG. 6 illustrates an example signal flow graph 600 for an adaptive power system according to an example embodiment. The signal flow graph 600 of the APS 200 may be utilized to simplify the analysis of the transfer function. The analysis of the transfer function below is based on the assumptions discussed above in reference to FIG. 5.

In an example embodiment, $I_{bus}$ is the controlled upstream bus current coming from the 375-V DC-DC converter 106, $I_{load}$ is the current to the dynamic load 107 before the low-pass filter 214, and $G_c$ is the transfer function of the signal filter 208, e.g. the 0.13-Hz filter, which has been selected to be a second order filter defined as $$G_c = \frac{\omega_c^2}{s^2 + (2\zeta\omega_c)s + \omega_c^2}, \quad (1)$$

where $\omega_c$ is the corner frequency (in rad/s) and $\zeta$ is the damping ratio. In this example, $\zeta$ is equal to 0.9.

In addition, $K_u$ is the energy compensation loop 206 gain that determines the outer loop bandwidth, $K_{droop}$ is the gain of the energy droop compensation (in J/A), $C_{act}$ is the actual capacitance of storage capacitor 202 (in Farads), and $K_c$ is the capacitance value (in Farads) used in converting the measured storage capacitor 202 voltage, $V_{store}$, to energy, such that the calculated stored energy is $\frac{1}{2}K_c V^2_{store}$. Using digital control, $K_c$ may be programmed based on $C_{act}$ to optimize the APS 200 response as $C_{act}$ varies over the life of the system. Ideally, $K_c$ may equal $C_{act}$ and $K_c/C_{act}$ may equal 1.

In an example embodiment, the transfer function $I_{bus(s)}/I_{load(s)}$ may be determined as follows:

$$\frac{I_{bus}(s)}{I_{load}(s)} = \sum_{k=1}^{N} \frac{P_k \Delta_k}{\Delta}, \quad (2)$$

where N is the total number of forward paths, $P_k$ is the gain of the $k^{th}$ forward path, $\Delta$ is the determinant, and $\Delta_k$ is the cofactor of path k. The gain of forward paths may be defined as $$P_1 = G_c, \quad (3)$$
$$P_2 = -K_{droop} K_u G_c,$$
$$P_3 = K_u \frac{K_c}{C_{act}} \frac{\overline{V_{bus}}}{s},$$

where the bar over $V_{bus}$ indicates a constant average value. The flow graph 600 of FIG. 6 includes a loop, which is defined as $$L = -K_u \frac{K_c}{C_{act}} \frac{\overline{V_{bus}}}{s}. \quad (4)$$

The determinant may be expressed as $$\Delta = 1 - L = 1 + K_u \frac{K_c}{C_{act}} \frac{\overline{V_{bus}}}{s}. \quad (5)$$

Because the loop, L, touches all of the forward paths, the cofactor for each forward path may be defined as $$\Delta_1 = \Delta_2 = \Delta_3 = 1. \quad (6)$$

This leads to a third-order model that includes just the signal filter 208, e.g. the 0.13-Hz filter, characteristics and the energy-loop compensation characteristics, such that $$\frac{I_{bus}(s)}{I_{load}(s)} = \frac{P_1\Delta_1 + P_2\Delta_2 + P_3\Delta_3}{\Delta}, \quad (7)$$

$$= \frac{G_c - K_{droop}K_u G_c + K_u \frac{K_c}{C_{act}} \frac{\overline{V_{bus}}}{s}}{1 + K_u \frac{K_c}{C_{act}} \frac{\overline{V_{bus}}}{s}},$$

$$= \frac{b_2 s^2 + b_1 s + b_0}{s^3 + a_2 s^2 + a_1 s + a_0},$$

where $$b_2 = \frac{K_c}{C_{act}} \overline{V_{bus}} K_u,$$

$$b_1 = \omega_c^2 - K_{droop} K_u \omega_c^2 + 2\frac{K_u}{C_{act}} \overline{V_{bus}} \zeta K_u \omega_c,$$

$$b_0 = \frac{K_c}{C_{act}} \overline{V_{bus}} K_u \omega_c^2,$$

$$a_2 = \frac{K_c}{C_{act}} \overline{V_{bus}} K_u + 2\zeta\omega_c,$$

$$a_1 = \omega_c^2 + 2\frac{K_u}{C_{act}} \overline{V_{bus}} \zeta K_u \omega_c,$$

$$a_0 = \frac{K_c}{C_{act}} \overline{V_{bus}} K_u \omega_c^2.$$

In an example embodiment $K_{droop}$ may be initially set equal to zero and $K_u$ set to a value that may produce a curve for $I_{bus(s)}/I_{load(s)}$ that matches the power ripple limit 402 from 0.1 Hz to 1 Hz, as discussed above in reference to FIG. 2. Next, $K_{droop}$ may be empirically set to the smallest value possible whereby the power ripple limit 402 remains matched and the overshoot and/or undershoot of the transfer function are minimized. Since $K_{droop}$ term is only in the numerator coefficient b1, $K_{droop}$ only affects the damping ratio for the numerator. In an instance in which the ratio $K_c/C_{act}$ is equal to one, the damping ratio for the numerator reduces to $$\zeta_{num} = \frac{\omega_c}{2}\left(\frac{1}{\overline{V_{bus}} K_u} - \frac{K_{droop}}{\overline{V_{bus}}} + \frac{2\zeta}{\omega_c}\right). \quad (8)$$

The sign in front of $K_{droop}$ is negative; therefore $K_{droop}$ decreases the damping of the numerator. The value of $K_{droop}$ may be selected to produce a positive value for the numerator damping ratio. For large values of $K_{droop}$ the numerator damping ratio may be negative, producing an undesirable response due to the resulting numerator right-half plane zeroes. Further fine tuning of the response may be performed by applying a step load to the transfer function $I_{bus(s)}/I_{load(s)}$ and making small adjustments to $K_{droop}$ while observing the resulting waveform of $I_{bus}$ in the time domain, to achieve a critically-damped response. An overdamped response may increase the capacitance value of the storage capacitor 202 needed and therefore result in a larger storage capacitor 202. An underdamped response may cause overshoot in the APS 200 response. In this example, $K_{droop}$ equals 744.8 J/A and $K_u$ equals 335e-6.

Figure 7:
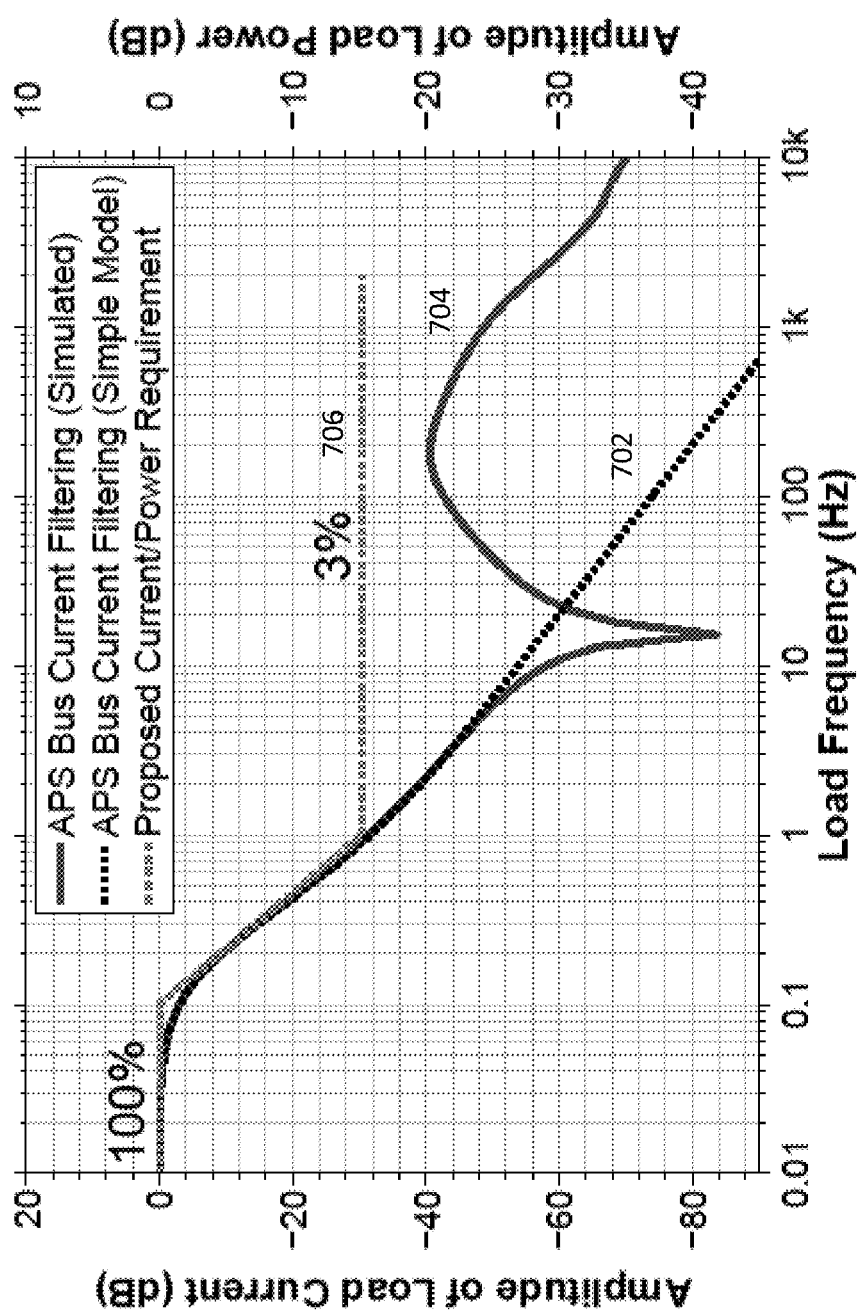
FIG. 7 illustrates an example bus current filtering performance graph according to an example embodiment.

FIG. 7 illustrates an example bus current filtering performance graph 700 according to an example embodiment. FIG. 7 demonstrates the predictions of equation 8 (line 702) are nearly identical to a detailed simulation result (line 704) up to 4 Hz, at which point interactions with the current control-loop compensator begin to appear. This data may be used to design the low-frequency characteristics of the APS 200 response and to determine the capacitance value for the storage capacitor 202. Also shown in FIG. 7 is the current-ripple rejection requirement (line 706 with the 100% and the 3% limits annotated) derived from the power-ripple limit 402 of FIG. 2 assuming the 375-V DC bus 107 is a regulated bus. Line 706 represents both the allowed current ripple and the allowed power ripple when using the appropriate y-axis.

FIG. 7 also provides the time-constant requirement via the frequency-domain specification to determine the storage capacitor 202 nominal capacitance value, $C_{design}$. The resulting time-constant requirement from FIG. 7 may define a duration for which the APS 200 needs to deliver the load current $I_{load}$ or absorb the load current $I_{load}$ to provide sufficient protection to the generator 102 and prime mover. The protection duration may be captured by the design parameter $K_{droop}$. Therefore, if $K_u$ and $K_{droop}$ have been selected as previously defined, where the requirements curve is met with a critically damped response, the amount of energy used for a stepped load from fully off to fully on may be determined from $K_{droop}$ and the maximum load current $I_{load}$. This results since $K_{droop}$'s units are Joules/Ampere. Knowing the amount of energy used, $$U_{total} = I_{loadmax} K_{droop}, \quad (9)$$

along with the maximum available energy for use, $$U_{max} = \frac{1}{2} C_{design}(V_{max}^2 - V_{min}^2), \quad (10)$$

the corresponding capacitance value may be solved for $$C_{design} = \frac{2 I_{loadmax} K_{droop}}{(V_{max}^2 - V_{min}^2)}. \quad (11)$$

Here, $I_{loadmax}$ is the designed maximum load current $I_{load}$ of the BDCS 204 module, $V_{max}$ is the maximum allowed storage capacitor voltage, $V_{min}$ is the minimum allowed storage capacitor voltage.

Equation 11 assumes that the energy reference in FIG. 6 is set to the energy stored by the storage capacitor 202 at the maximum voltage value, and that $K_{droop}$'s value is set to adjust this energy-reference level to the minimum value (minimum voltage across storage capacitor 202) when the load current is at a maximum. For the example APS 200 depicted in FIG. 5, the maximum voltage is set at 770 V and the minimum voltage is set at 450 V. The resultant capacitance value of $C_{design}$ is 86.7 mF for the BDCS 204. In an example embodiment in with the APS 200 includes thirty-eight parallel BDCS 204 modules, a maximum stored energy per BDCS 204 module is equal to 25.7 kJ.

Figure 8:
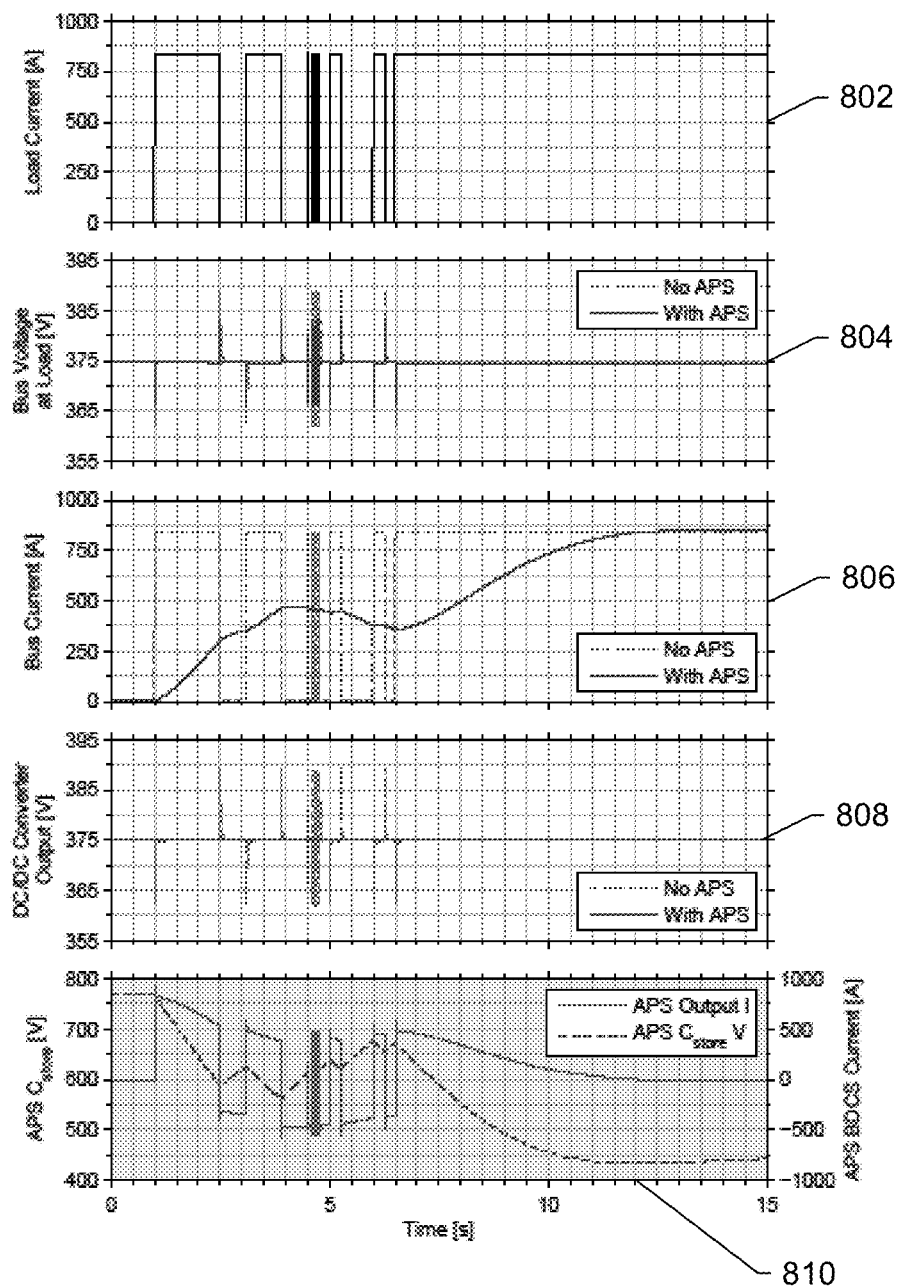
FIGS. 8 and 9 illustrate current, voltage, power and speed graphs for an example load profile according to an example embodiment.
Figure 9:
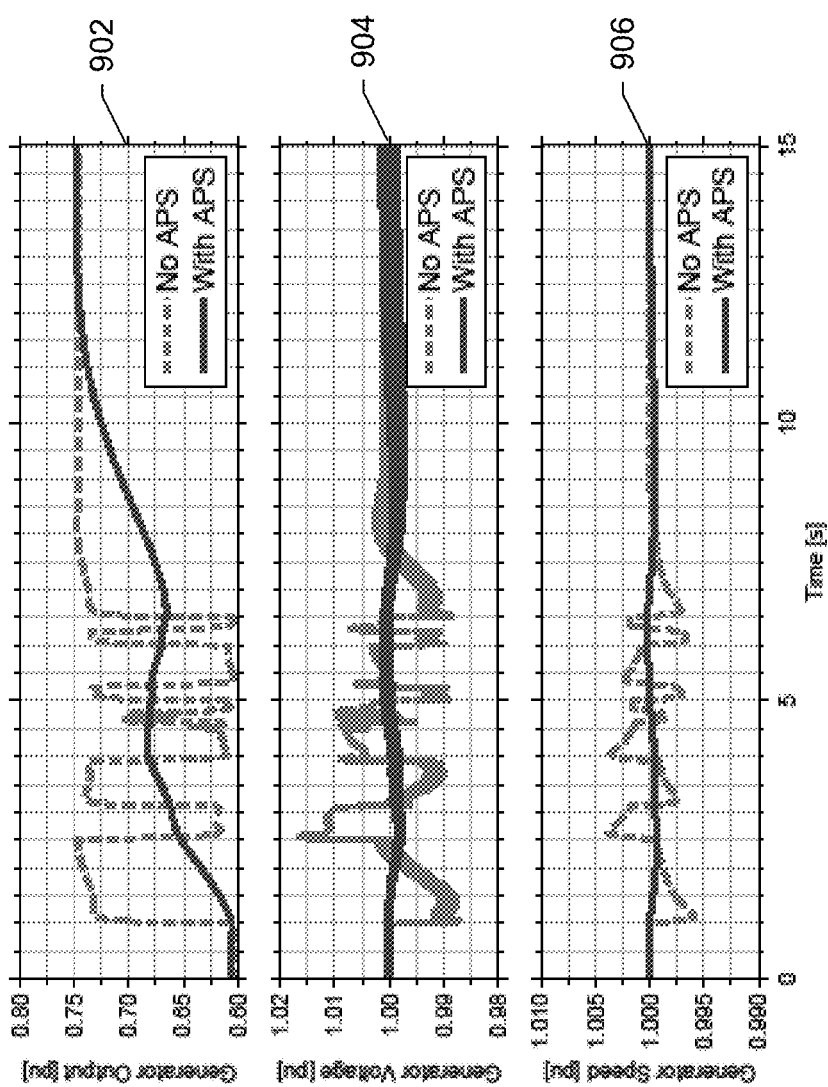

FIGS. 8 and 9 illustrate current graphs for an example dynamic load profile according to an example embodiment. FIGS. 8 and 9 provide simulation results for various waveforms in the power distribution system 100 when a dynamic load profile is applied both with and without use of the APS 200. For this simulation, the generator 102 is biased with a 0.6 p.u. load prior to applying the dynamic load profile.

The dynamic load profile chosen includes varying duty cycles and simulates the extreme stressing condition of having significant off times in the dynamic load profile, simulating a bang-ON-bang-OFF operation of a 300 kW dynamic load 108, which may be a high stress condition for the generator 102. For the depicted extreme dynamic load profile, the ramp rate seen by the generator 102 with the use of the APS 200 is extremely slow, with the maximum ramp rate shown in FIG. 9 being less than 0.1 MVA/sec (where 1 p.u. (per unit) is equal to 2.28 MVA). The generator control loops may be able to easily maintain regulation through this very slow changing disturbance. The current graphs also demonstrate that the AC/DC converter 104 and DC/DC converter 106 do little to reduce the low to medium frequency content, with most of the load of the dynamic load profile appearing at the generator terminals when the APS 200 is not used.

The generator 102 voltage and prime-mover speed (frequency) disturbances are much smaller with the use of the APS 200. The frequency and voltage modulation created by the dynamic load profile without the APS 200 demonstrates that a nominal power distribution system of this size encroaches on the respective modulation limits of 0.5% and 2% set by MIL-STD-1399-680. A larger dynamic load profile or the example dynamic load profile combined with other platform loads may result in a noncompliant power distribution system.

Although not depicted in the generator results of FIG. 9, in an instance in which shaft resonances are excited (e.g., subsynchronous resonances), significant torques larger than the full-load steady-state torque may be seen on the shaft. In instances in which these disturbances exist, mechanical stresses to other parts of the generator 102 may also occur. As depicted in FIG. 9, the APS 200 significantly reduces frequencies that may excite potentially dangerous mechanical resonances as well as cause fatigue due to excessive movements.

FIG. 8 also shows the voltage waveform of the storage capacitor 202 and the current waveform of the BDCS 204, demonstrating the capability of the APS 200 to provide dynamic current to the dynamic load 108 resulting in the generator 102 only having to provide the rolling average of the dynamic load profile. The 375-V bus voltage delivered to the dynamic load 108 is also shown in FIG. 8, indicating that a ±5% transient regulation requirement is met.

At time 6.5 seconds in FIG. 8, the load of the dynamic load profile switches to a constant load and the APS 200 consumes no power (APS output current goes to zero) after about 5 seconds from this point in time, demonstrating the efficient conditioning method provided by the APS 200. In an instance in which the APS 200 is used for a periodic dynamic load application, the generator 102 may see a substantially constant load with only a small power ripple riding on top of the dynamic load profile average power draw.

Returning to FIG. 7, the bus current filtering performance graph 700 demonstrates the filtering capability of the APS 200 in the frequency domain. The load rejection provided by the APS 200 as viewed from the output of the upstream 375-V DC-DC converter 106 is depicted by line 704. The current ripple rejection requirement (line 702 with the 100% and the 3% limits annotated) has been superimposed on the APS 200 results, showing that the APS 200 satisfies a proposed filtering requirement. The APS 200 removes the low to mid frequencies that may degrade the generator shaft or could excite potentially hazardous resonances. In addition, removing these frequencies from the power distribution bus means the distribution bus quality for other loads may be improved, e.g. fewer disturbances may exist due to the dynamic load interacting with the bus impedances and the generator 102.

In some example embodiments, the APS 200 may be further configured for additional operations or optional modifications. In this regard, for example, in an example embodiment, the energy source may be a storage capacitor, a battery, a super capacitor, or super conducting magnetic energy storage. In some example embodiments, the energy source comprises a plurality of capacitors configured in a capacitor bank. In some example embodiments, the control loop comprises an energy compensation loop configured to maintain a voltage across energy source. In an example embodiment, the energy compensation loop comprises a bandwidth control circuit. In some example embodiments, the energy compensation loop comprises a voltage droop circuit. In an example embodiment, the signal filter and control loop are configured to regulate a current output to the power distribution bus to deliver the dynamic current to the dynamic load. In some example embodiments, the adaptive power system also includes a low pass filter disposed between the power distribution system and the dynamic load. In an example embodiment, the adaptive power system also includes an electromagnetic interference filter disposed between the power distribution system and the dynamic load. In some example embodiments, the bidirectional current source comprises a plurality of bidirectional current source modules electrically connected in parallel. In an example embodiment, the dynamic load comprises an energy sensor or energy weapon.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:
1. An adaptive power system comprising:
an energy source;
a bidirectional current source configured to be electrically connected between the energy source and a power distribution bus of a power distribution system, wherein the bidirectional current source is configured to deliver and absorb power from the power distribution system to buffer a dynamic load profile of a dynamic load;

an electromagnetic interference filter disposed between the power distribution system and the dynamic load; and a control loop and signal filter configured to control the bidirectional current source and regulate energy stored in the energy source.

2. The adaptive power system of claim 1, wherein the energy source comprises a storage capacitor, a battery, a super capacitor, or super conducting magnetic energy storage.

3. The adaptive power system of claim 1, wherein the energy source comprises a plurality of capacitors configured in a capacitor bank.

4. The adaptive power system of claim 1, wherein the control loop comprises an energy compensation loop configured to maintain a voltage across the energy source.

5. The adaptive power system of claim 4, wherein the energy compensation loop comprises a bandwidth control circuit.

6. The adaptive power system of claim 4, wherein the energy compensation loop comprises a voltage droop circuit.

7. The adaptive power system of claim 1, wherein the signal filter is configured to regulate a current output to the power distribution bus to provide dynamic current to the dynamic load.

8. The adaptive power system 1 further comprising a low pass filter disposed between the power distribution system and the dynamic load.

9. The adaptive power system of claim 1, further comprising a plurality of the bidirectional current source modules electrically connected in parallel.

10. The adaptive power system of claim 1, wherein the dynamic load comprises an energy sensor or energy weapon.

11. A power distribution system comprising:
a dynamic load;
a generator configured to supply power to the dynamic load via a power distribution bus; and
an adaptive power system comprising:
   an energy source;
   a bidirectional current source configured to be electrically connected between the energy source and the power distribution bus, wherein the bidirectional current source is configured to deliver and absorb power from the power distribution system to buffer a dynamic load profile of the dynamic load;
   an electromagnetic interference filter disposed between the generator and the dynamic load; and
   a control loop and passive signal filter configured to control the bidirectional current source and regulate energy stored in the energy.

12. The power distribution system of claim 11, wherein the energy source comprises a storage capacitor, a battery, a super capacitor, or super conducting magnetic energy storage.

13. The power distribution system of claim 11, wherein the capacitor comprises a plurality of capacitors configured in a capacitor bank.

14. The power distribution system of claim 11, wherein the control loop comprises an energy compensation loop configured to maintain a voltage across the energy source.

15. The power distribution system of claim 14, wherein the energy compensation loop comprises a bandwidth control circuit.

16. The power distribution system of claim 14, wherein the energy compensation loop comprises a voltage droop circuit.

17. The power distribution system of claim 11, wherein the signal filter is configured to regulate a current output to the power distribution bus to provide dynamic current to the dynamic load.

18. The power distribution system 12, wherein the adaptive power system further comprises a low pass filter disposed between the bidirectional current source and the dynamic load.

* * * * *